United States Patent
Lehtovirta et al.

(10) Patent No.: US 11,146,951 B2
(45) Date of Patent: Oct. 12, 2021

(54) METHODS AND APPARATUSES FOR RE-ESTABLISHING A RADIO RESOURCE CONTROL (RRC) CONNECTION

(71) Applicant: Telefonaktiebolaget LM Ericsson (publ), Stockholm (SE)

(72) Inventors: Vesa Lehtovirta, Espoo (FI); Prajwol Kumar Nakarmi, Sollentuna (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 402 days.

(21) Appl. No.: 16/084,165

(22) PCT Filed: Jan. 29, 2018

(86) PCT No.: PCT/EP2018/052162
§ 371 (c)(1),
(2) Date: Sep. 11, 2018

(87) PCT Pub. No.: WO2018/138355
PCT Pub. Date: Aug. 2, 2018

(65) Prior Publication Data
US 2020/0337104 A1 Oct. 22, 2020

Related U.S. Application Data

(60) Provisional application No. 62/451,866, filed on Jan. 30, 2017.

(51) Int. Cl.
*H04W 12/06* (2021.01)
*H04W 76/25* (2018.01)
(Continued)

(52) U.S. Cl.
CPC ............. *H04W 12/06* (2013.01); *H04W 8/08* (2013.01); *H04W 12/041* (2021.01);
(Continued)

(58) Field of Classification Search
CPC ..... H04W 12/06; H04W 76/25; H04W 76/19; H04W 76/27; H04W 12/0401;
(Continued)

(56) References Cited

U.S. PATENT DOCUMENTS 8,145,195 B2   3/2012  Forsberg et al.
2009/0258631 A1  10/2009  Forsberg et al.
(Continued)

FOREIGN PATENT DOCUMENTS

CN    103974247 A    8/2014
EP    2 426 996 A1   3/2012
(Continued)

OTHER PUBLICATIONS

Japanese Office Action issued in Japanese Patent Application No. 2019-536077, dated Dec. 6, 2019, and English language Summary of Office Action thereof (4 pages).
(Continued)

*Primary Examiner* — Habte Mered
(74) *Attorney, Agent, or Firm* — Rothwell, Figg, Ernst & Manbeck, P.C.

(57) ABSTRACT

A method for re-establishing a Radio Resource Control, RRC, connection between a User Equipment (1), UE, and a target evolved NodeB (3), target eNB, the method being performed by the UE (1) and comprising: receiving (S100) an RRC Connection Reestablishment message from the target eNB (3), the RRC Connection Reestablishment message including a downlink, DL, authentication token which has been generated by a Mobility Management Entity (4) and has had a Non Access Stratum integrity key as input; and authenticating (S110) the received DL authentication token. Discloses are also UEs, target eNBs, source eNBs and Mobility Management Entities as well as methods, computer programs and computer program product related thereto.

30 Claims, 11 Drawing Sheets

(51) Int. Cl.
*H04W 76/19* (2018.01)
*H04W 76/27* (2018.01)
*H04W 8/08* (2009.01)
*H04W 12/10* (2021.01)
*H04W 80/02* (2009.01)
*H04W 12/041* (2021.01)

(52) U.S. Cl.
CPC ........... *H04W 12/10* (2013.01); *H04W 76/19* (2018.02); *H04W 76/25* (2018.02); *H04W 76/27* (2018.02); *H04W 80/02* (2013.01)

(58) Field of Classification Search
CPC ....... H04W 12/10; H04W 8/08; H04W 80/02; H04W 36/0005; H04W 36/0038
See application file for complete search history.

(56) References Cited

U.S. PATENT DOCUMENTS

| | | |
|---|---|---|
| 2010/0267363 A1 | 10/2010 | Blom et al. |
| 2011/0261961 A1 | 10/2011 | Dharmaraju et al. |
| 2013/0260810 A1 | 10/2013 | Rayavarapu |
| 2014/0295820 A1 | 10/2014 | Kim et al. |
| 2016/0227410 A1 | 8/2016 | Narasimha et al. |
| 2018/0132293 A1* | 5/2018 | Escort ................... H04W 76/19 |
| 2019/0045561 A1* | 2/2019 | Gupta ................... H04W 76/12 |
| 2019/0320482 A1* | 10/2019 | Hu .......................... H04W 80/02 |
| 2020/0304985 A1* | 9/2020 | Gupta ................... H04W 80/10 |

FOREIGN PATENT DOCUMENTS

| | | | | |
|---|---|---|---|---|
| WO | 2010124430 A1 | 11/2010 | | |
| WO | 2011/052995 A2 | 5/2011 | | |
| WO | 2013/062388 A2 | 5/2013 | | |
| WO | 2015/066406 A2 | 5/2015 | | |
| WO | 2018/031345 A1 | 2/2018 | | |
| WO | WO-2018031345 A1 * | 2/2018 | ............ | H04W 76/27 |
| WO | 2018/083151 A1 | 5/2018 | | |
| WO | 2018/138163 A1 | 8/2018 | | |

OTHER PUBLICATIONS

3GPP TSG-RAN WG2 #95 (R2-164999), "Inter-eNB connected mobility for NB-IOT UE using Clo T EPS CP optimisation", Intel Corporation, Aug. 22-26, 2016, Gothenburg, Sweden (6 pages).
3GPP TSB-RAN WG2 NB-IOT Ad-hoc Meeting (R2-160522), "RRC aspects of Suspend/Resume Procedure", Samsung, Jan. 19-21, 2016, Budapest, Hungary (6 pages).
3GP TSG-RAN WG2 #95bis (R2-166683), "Connected mode mobility for NB-IOT UE using CP CIoT EPS optimisation", Intel Corporation, Oct. 10-14, 2016, Kaohsiung (8 pages).
International Search Report and Written Opinion issued in International Application No. PCT/EP2018/052162, dated Apr. 30, 2018, 14 pages.
3GPP TS 33.401 V15.2.0, 3rd Generation Partnership Project; Technical Specification Group Services and System Aspect; 3GPP System Architecture Evolution (SAE); Security architecture (Release 15), Jan. 2018, 163 pages.
Huawei, et al., "NAS security solution for DoNAS RLF", 3GPP TSG SA WG3 (Security) eMeeting on DoNAS(NB-Io-T), S3A0008 Revision of S3A0006, May 2017, 3 pages.
Orhanou, Ghizlane et al., "EPS Confidentiality and Integrity mechanisms Algorithmic Approach", IJCSI International Journal of Computer Science Issues, vol. 7, No. 4 Jul. 2010, 9 pages.
3GPP TS 33.401 V14.1.0, 3rd Generation Partnership Project; Technical Specification Group Services and System Aspect; 3GPP System Architecture Evolution (SAE); Security architecture (Release 14), Dec. 2016, 152 pages.
3GPP TS 24.301 V14.2.0, 3rd Generation Partnership Project; Technical Specification Group Core Network and Terminals; Non-Access-Stratum (NAS) protocol for Evolved Packet System (EPS); Stage 3 (Release 14), Dec. 2016, 470 pages.
3GPP TS 23.401 V14.2.0, 3rd Generation Partnership Project; Technical Specification Group Services and System Aspects; General Packet Radio Services (GPRS) enhancements for Evolved Universal Terrestrial Radio Access Network (E-UTRAN) access (Release 14), Dec. 2016, 385 pages.
Intel Corporation, "Security of RRC Connection re-establishment of NB-IOT for CP Solution", 3GPP TSG SA WG3 (Security) Meeting #85, S3-161717, Santa Cruz (Spain), Nov. 7-11, 2016, 5 pages.
Ericsson, Solution of "Establish an interface instance per eNB" in Study Flexible eNB-ID and Cell-ID in E-UTRAN 3GPP TSG-RAN WG3 Meeting #92, RE-161324, Nanjing, P.R. China, May 23-27, 2016, 2 pages.
3GPP TS 36.331 V14.1.0, 3rd Generation Partnership Project; Technical Specification Group Radio Access Network; Evolved Universal Terrestrial Radio Access (E-UTRA); Radio Resource Control (RRC); Protocol specification (Release 14), Dec. 2016, 654 pages.
Bangladesh Examination Examination Report issued in Bangladesh Application No. 034/2018/2277, dated May 23, 2019, 1 page.
Korean Office Action with English translation, issued in corresponding Korean Application No. 10-2019-7022411, dated Nov. 20, 2019 pages.
First Chinese Office Action, issued in corresponding Chinese Application No. 201880009288.5, dated Feb. 3, 2020, 6 pages.
3GPP TSG SA WG3 (Security) Meeting #85, (S3-161717), "Security of RRC Connection re-establishment of NB-IOT for CP Solution", Nov. 7-11, 2016, Santa Cruz, Spain (5 pages).
Bangladesh Examination Report issued in Bangladesh Application No. 034/2018/2277, dated Aug. 4, 2019, 1 page.

\* cited by examiner

METHODS AND APPARATUSES FOR RE-ESTABLISHING A RADIO RESOURCE CONTROL (RRC) CONNECTION

CROSS REFERENCE TO RELATED APPLICATION(S)

This application is a 35 U.S.C. § 371 National Stage of International Patent Application No. PCT/EP2018/052162, filed Jan. 29, 2018, designating the United States and claiming priority to U.S. provisional application No. 62/451,866, filed on Jan. 30, 2017. The above identified applications are incorporated by reference.

TECHNICAL FIELD

The invention relates to methods, User Equipment, source NodeBs, target NodeBs, Mobility Management Entities, computer programs, and computer program product for re-establishing a Radio Resource Control connection.

BACKGROUND

Control Plane (CP) Cellular Internet of Things (CIoT) optimizations (also called Data Over Non-Access Stratum (NAS) (DoNAS)) is a solution for transporting data over NAS as specified in 3rd Generation Partnership Project (3GPP) technical specification TS 23.401 V14.2.0, clause 5.3.4B (and other specifications, e.g. TS 24.301 V14.2.0). The security features are specified in TS 33.401 V14.1.0, clause 8.2. The security impact of the basic solution is very limited. The purpose of the DoNAS feature is sending data over NAS signalling without establishing data radio bearers (DRBs) and without establishing Access Stratum (AS) security. The intention is to save signalling. FIG. 1, which corresponds to FIG. 5.3.4B.2-1 of TS 23.401 V14.2.0, illustrates the DoNAS principle.

Work item in 3GPP document R3-161324 looks at mobility enhancements for CP CIoT. Handovers are not supported for CP CIoT, but a User Equipment (UE) may anyway move, causing a radio link failure (RLF) when the UE is in connected mode (i.e. has Radio Resource Control (RRC) connection with an evolved NodeB (eNB). This has raised the issue of what to do in such case. Since AS security is not supported for CP CIoT feature, the existing mechanisms for RLF cannot be used securely as it is. In other words, it is not acceptable security-wise to use the existing RLF handling mechanism in the CP CIoT.

The RRC Layer is in the current LTE (Long Term Evolution) systems, see e.g. 3GPP TS 36.331 V14.1.0, specified as including an information element (IE) called ShortMAC-I which is used for identification of the UE, for example, during RRC Connection Reestablishment procedures. The calculation of the ShortMAC-I includes the following as input:
  RRC integrity key: BIT STRING (SIZE (128))
  Target cell's identity: BIT STRING (SIZE (28))
  Source cell's physical cell identity: INTEGER (0 . . . 503)
  UE's C-RNTI (Cell Radio Network Temporary Identifier) at the source cell: BIT STRING (SIZE (16))
  The function used is specified in TS 33.401 V14.1.0.

The RRC Layer is in LTE systems specified as including an information element (IE) called ShortResumeMAC-I which is used for identification of the UE, for example, during RRC Connection Resume procedures. The calculation of the ShortResumeMAC-I includes the following as the input:
  RRC integrity key: BIT STRING (SIZE (128))
  Target cell's identity: BIT STRING (SIZE (28))
  Source cell's physical cell identity: INTEGER (0 . . . 503)
  UE's C-RNTI at the source cell: BIT STRING (SIZE (16))
  Resume constant
  Note that the calculation of ShortResumeMAC-I includes additionally a resume constant, which allows differentiation of ShortMAC-I from ResumeShortMAC-I. The used function=is specified in TS 33.401 V14.1.0.

SUMMARY

It is an object of the invention to enable reduced signalling during re-establishing of a radio resource control connection.

Another object of the invention is to enable authentication of a target eNB by the UE during RRC connection re-establishment.

According to a first aspect of the invention, a method is presented for re-establishing a Radio Resource Control (RRC) connection between a User Equipment (UE) and a target evolved NodeB (target eNB). The method is performed by the UE and comprising:
  receiving an RRC Connection Reestablishment message from the target eNB, the RRC Connection Reestablishment message including a downlink (DL) authentication token which has been generated by a Mobility Management to Entity (MME) and has had a Non Access Stratum (NAS) integrity key as input; and
  authenticating the received DL authentication token.

Hereby is, inter alia, achieved that the UE is enabled to authenticate an eNB during RRC connection re-establishment, such as RRC connection re-establishment for EPS CP IoT optimization, with the help of a NAS integrity key. Thus, no Access Stratum (AS) keys need to be created, which is very beneficial, for example in that NAS keys must be generated anyway, whereas AS keys would have to be generated solely for being used in RRC connection re-establishment.

The method may also comprise a step of calculating an uplink (UL) authentication token with the NAS integrity key as input, and sending an RRC connection reestablishment request including the UL authentication token to the target eNB. The UL authentication token may in that case be calculated with a target cell's identity as input. The target cell's identity may in the latter case be included in the RRC connection reestablishment request.

The DL authentication token may in an embodiment of the method have been calculated by the MME with a target cell's identity as input.

The RRC Connection Reestablishment message may include an Input MAC CIoT DL. Authenticating the received DL authentication token may be done by using the Input-MAC CIoT DL and the Non Access Stratum integrity key. The Input-MAC CIoT DL may comprise the target cell's identity.

A second aspect relates to a method for re-establishing an RRC connection between a UE and a target eNB and is performed by the target eNB. The method comprises:
  receiving, from an MME, a message including a DL authentication token that has been generated by the MME, wherein the DL authentication token has been generated with a NAS integrity key as input; and
  sending an RRC Connection Reestablishment message to the UE, the RRC Connection Reestablishment message including the DL authentication token.

In an embodiment of the second aspect, the method comprises receiving from the UE an RRC connection reestablishment request which includes a UL authentication token, wherein the UL authentication token has been calculated by the UE with the NAS integrity key as input. The UL authentication token may then have been calculated by the UE with a target cell's identity as input.

In an embodiment of the second aspect, the DL authentication token has been calculated by the MME with a target cell's identity as input.

In an embodiment of the second aspect, the RRC Connection Reestablishment message includes an Input MAC CIoT DL.

The received message may be a Patch Switch Request Acknowledge message and including Input-MAC CIoT DL. The received message may alternatively be a Check MAC Acknowledge message and include Input-MAC CIoT DL.

A third aspect relates to a method for re-establishing an RRC connection between a UE and a target eNB and is performed in a source eNB. The method comprises:

obtaining a DL authentication token that has been generated with a NAS integrity key as input; and sending a response message to the target eNB, the response message including the obtained DL authentication token.

The obtaining does in an embodiment of the third aspect comprise:

generating the authentication token, or receiving an S1 Check response message from an MME, the received S1 Check response message including the DL authentication token and/or Input-MAC CIoT DL.

The response message is in an embodiment of the third aspect an X2 UE in Context response message.

A fourth aspect relates to a method for re-establishing an RRC connection between a UE and a target eNB and is performed by an MME. The method comprises:

generating a DL authentication token with a NAS integrity key as input; and sending a message including the generated DL authentication token to the target eNB.

In an embodiment of the fourth aspect, the generation of the DL authentication token is done with a target cell's identity as input (in addition to the NAS integrity key).

The method according to the fourth aspect may comprise:

receiving a UL authentication token from the target eNB, said UL authentication token having been generated by the UE with the NAS integrity key as input, and verifying the UL authentication token.

The UL authentication token may have been generated by the UE with a target cell's identity as input.

The message may be a Path Switch Request Acknowledge message and include Input-MAC CIoT DL. The method may in another embodiment be a Check MAC Acknowledge message and include Input-MAC CIoT DL.

A fifth aspect of the invention relates to a UE for re-establishing an RRC connection between the UE and a target eNB. The UE comprises:

a processor; and a computer program product which stores instructions that, when executed by the processor, causes the UE to:

receive an RRC Connection Reestablishment message from the target eNB, the RRC Connection Reestablishment message including a DL authentication token which has been generated by an MME and has had a NAS integrity key as input; and authenticate the received DL authentication token.

In an embodiment of the UE, the RRC Connection Reestablishment message includes Input-MAC CIoT DL, and the received DL authentication token is authenticated by using the Input-MAC CIoT DL and the Non Access Stratum integrity key.

In an embodiment of the UE, the DL authentication token has been calculated by the MME with a target cell's identity as input.

A sixth aspect relates to a target eNB for re-establishing an RRC connection between a UE and the target eNB. The target eNB comprises:

a processor; and a computer program product storing instructions that, when executed by the processor, causes the target eNB to:

receive, from an MME, a message including a DL authentication token that has been generated by the MME, wherein the DL authentication token has been generated with a NAS integrity key as input; and send an RRC Connection Reestablishment message to the UE, the RRC Connection Reestablishment message including the DL authentication token.

The DL authentication token has in an embodiment of the target eNB been calculated by the MME with a target cell's identity as input.

The RRC Connection Reestablishment message includes in an embodiment of the target eNB an Input MAC CIoT DL, i.e. input for the generation of the DL authentication token.

The received message is in an embodiment of the target eNB a Patch Switch Request Acknowledge message and includes Input-MAC CIoT DL.

The received message is in another embodiment of the target eNB a Check MAC Acknowledge message and includes Input-MAC CIoT DL.

A seventh aspect relates to a source eNB for re-establishing an RRC connection between a UE and a target eNB. The source eNB comprises:

a processor; and a computer program product storing instructions that, when executed by the processor, causes the source eNB to:

obtain a DL authentication token that has been generated with a Non Access Stratum integrity key as input; and send a response message to the target eNB, the response message including the obtained DL authentication token.

The response message is in an embodiment of the source eNB an X2 UE Context response message.

An eighth aspect relates to an MME for re-establishing an RRC connection between a UE and a target eNB. The MME comprises:

a processor; and a computer program product storing instructions that, when executed by the processor, causes the MME to:

generate a DL authentication token with a NAS integrity key as input; and send a message including the generated DL authentication token to the target eNB.

The message is in an embodiment of the MME a Path Switch Request Acknowledge message and the message is in that embodiment including an Input-MAC CIoT DL.

The message is in another embodiment of the MME a Check MAC Acknowledge message. The message includes in that case an Input-MAC CIoT DL.

A ninth aspect relates to a UE for re-establishing an RRC connection between the UE and a target eNB. The UE comprises:

a communication manager for receiving a RRC Connection Reestablishment message from the target eNB, the RRC Connection Reestablishment message including a DL authentication token which has been generated by an MME and has had a NAS integrity key as input; and a determination manager for authenticating the received DL authentication token.

A tenth aspect relates to a target eNB for re-establishing an RRC connection between a UE and the target eNB. The target eNB comprises:

a communication manager for receiving, from an MME, a message including a DL authentication token that has been generated by the MME, wherein the DL authentication token has been generated with a NAS integrity key as input; and for sending an RRC Connection Reestablishment message to the UE, the RRC Connection Reestablishment message including the DL authentication token.

An eleventh aspect relates to a source eNB for re-establishing an RRC connection between a UE and a target eNB. The source eNB comprises:

a determination manager for obtaining a DL authentication token that has been generated with a NAS integrity key as input; and a communication manager for sending a response message to the target eNB, the response message including the obtained DL authentication token.

A twelfth aspect relates to an MME for re-establishing an RRC connection between a UE and a target eNB. The MME comprises:

a determination manager for generating a DL authentication token with a NAS integrity key as input; and a communication manager for sending a message including the generated DL authentication token to the target eNB.

A thirteenth aspect relates to a computer program for re-establishing an RRC connection between a UE and a target eNB. The computer program comprises computer program code which, when run on the UE, causes the UE to:

receive an RRC Connection Reestablishment message from the target eNB, the RRC Connection Reestablishment message including a DL authentication token which has been generated by an MME and has had a NAS Stratum integrity key as input; and authenticate the received DL authentication token.

A fourteenth aspect relates to a computer program for re-establishing an RRC connection between a UE and a target eNB. The computer program comprises computer program code which, when run on the target eNB, causes the target eNB to:

receive, from an MME, a message including a DL authentication token that has been generated by the MME, wherein the DL authentication token has been generated with a NAS integrity key as input; and send an RRC Connection Reestablishment message to the UE, the RRC Connection Reestablishment message including the DL authentication token.

A fifteenth aspect relates to a computer program for re-establishing an RRC connection between a UE and a target eNB. The computer program comprises computer program code which, when run on a source eNB, causes the source eNB to:

obtain a DL authentication token that has been generated with a NAS integrity key as input; and send a response message to the target eNB, the response message including the obtained DL authentication token.

A sixteenth aspect relates to a computer program for re-establishing an RRC connection between a UE and a target eNB. The computer program comprises computer program code which, when run on an MME, causes the MME to:

generate a DL authentication token with a NAS integrity key as input; and send a message including the generated DL authentication token to the target eNB.

A seventeenth aspect relates to a computer program product comprising at least one of the computer programs according to the thirteenth to sixteenth aspects and a computer readable storage means on which the at least one computer program is stored.

In all the seventeen aspects above, the re-establishment for RRC connection may be for Control Plane Internet-of-Things optimizations.

Generally, all terms used in the itemized list of embodiments are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 3b schematically shows signalling according to a part of an embodiment presented herein and started in FIG. 3a;

FIG. 4b schematically shows signalling according to a part of an embodiment presented herein and started in FIG. 4a;

DETAILED DESCRIPTION

Figure 1:
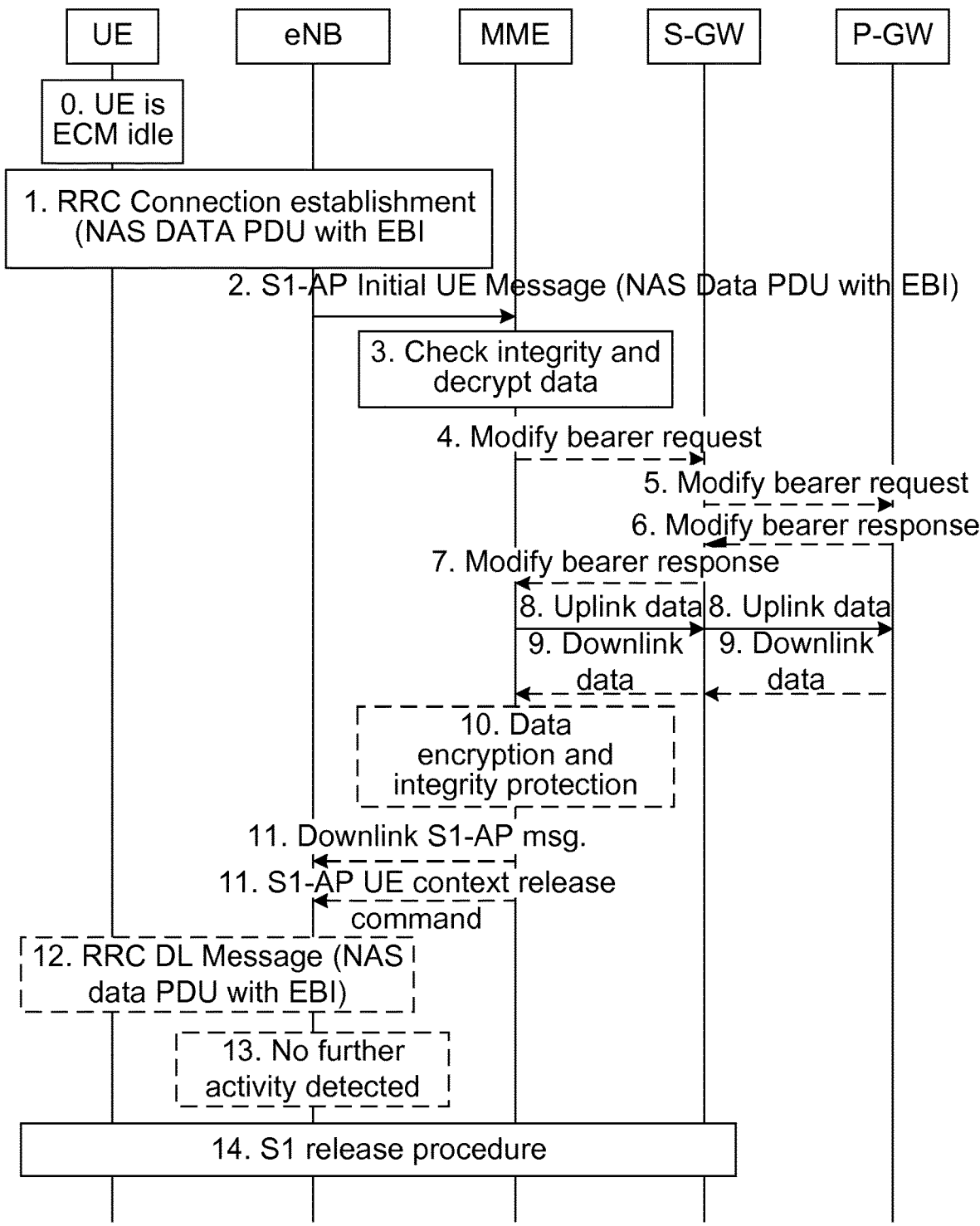
FIG. 1 schematically shows DoNAS principle signalling.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Radio Resource Control (RRC) connection re-establishment and RRC connection suspend/resume procedures are existing solutions, which could be candidates for handling a radio link failure in case of a Control Plane (CP) Cellular Internet of Things (CIoT) optimizations case. Both of those existing solutions use a User Equipment's (UE's) authentication token as described in the background to show to an evolved NodeB (eNB) that a genuine UE 1 wants to re-establish or resume an RRC connection. In addition, integrity protected RRC messages in downlink (DL) direction are used to show to the UE 1 that it is connected to a genuine eNB. However, those solutions are relying on the existence of Access Stratum (AS) security (especially RRC security), but AS security and RRC security do not exist or are not used for CP CIoT optimizations. Therefore, the RRC connection re-establishment and the RRC connection suspend/resume procedures as it is, are not acceptable security-wise to be used for handling mobility in the CP CIoT.

A solution described in the 3GPP contribution S3-161717 proposes that an authentication token would be based on a new RRC integrity key (called KeNB-RRC) which can be derived by both the UE 1 and the Mobility Management Entity (MME) 4, without setting up AS security (including RRC security) between the UE 1 and the source eNB 2 via AS Security Mode Command (SMC) procedure, and the token would be used between the UE 1 and the target eNB 3. However, the solution described in 3GPP contribution S3-161717 is trying to solve the problem of how to show to the eNB that a genuine UE 1 wants to re-establish an RRC connection. The problem of how to show to the UE 1 that it is connected to a genuine eNB is not contemplated.

In the absence of AS security, and consequently the absence of integrity protection of DL RRC messages from the eNB to the UE, in the context of CP CIoT mobility, there is currently no way to show to the UE that it is connected to a genuine eNB. To mitigate that problem, the use of an authentication token in DL direction from the network to the UE is presented. The authentication token can be generated and sent by the MME, the source eNB or the target eNB. The DL authentication token may be calculated using the NAS or AS keys (although the latter is not within the scope of the claims of this application) depending on which entity that is sending it. The following cases are identified:

A DL authentication token is always sent to the UE via the target eNB.

The following four variant solutions show how this can be achieved.

1a. DL authentication token is sent from the source eNB via the target eNB to the UE and is checked by the UE with an AS key. Alternatively, the target eNB calculates the token with KrrC_int keys received from the source eNB. This variant is not within the scope of the claims of this application.

1b. DL authentication token is sent from the MME via the source eNB and target eNB to UE and is checked by the UE with a NAS key.

2a. DL authentication token is sent from the MME in a Path Switch Acknowledge message via the target eNB to the UE and the UE checks the DL authentication token with a NAS key.

2b. DL authentication token is sent from the MME in a new message via the target eNB to the UE and the UE checks the token with a NAS key.

When a check made by the UE that it is connected to a genuine eNB is based on a DL authentication token, there is no need to establish AS keys at all. Hence generation of AS keys can be avoided, which is beneficial, since the AS keys otherwise would only have to be generated for the purpose of the re-establishment of the RRC connection and not be used for anything more. NAS keys would however be usable for other security issues than just to authenticate the eNB.

More precisely, the NAS keys have anyway been created, since a NAS security context exists for a UE which sends data over the NAS.

Figure 2:
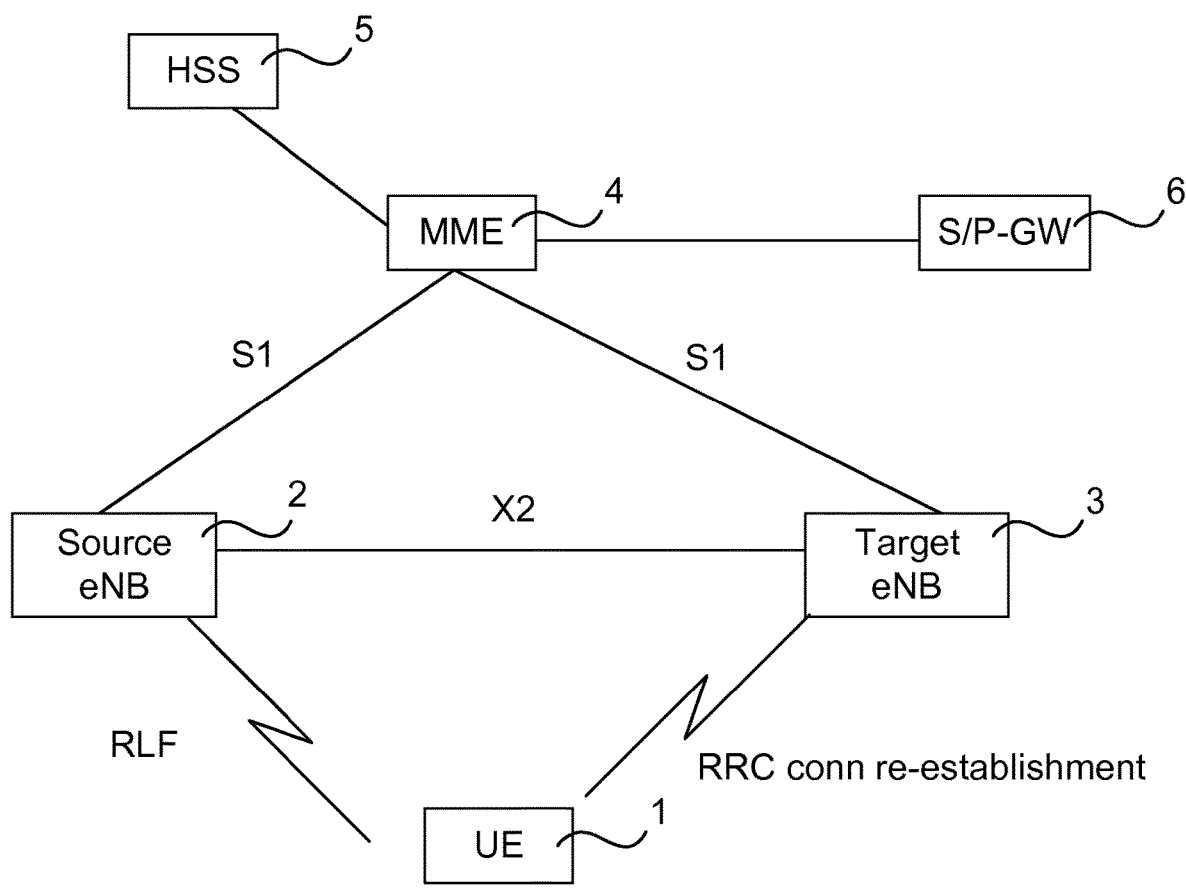
FIG. 2 schematically illustrates an environment where embodiments presented herein can be applied.

When the UE experiences a radio link failure (RLF) during CP CIoT (DoNAS) connection, the UE tries to re-establish the RRC connection to another eNB, see FIG. 2.

The network's authentication token for use in CP CIoT (denoted MAC CIoT DL) is a token that will be used for authentication of the network, i.e. to show to the UE 1 that it is connected to a genuine target eNB 3.

The MAC CIoT DL may according to aspects of the claimed invention be calculated with the following as the input:

NAS integrity key (NAS-int, e.g. $K_{NASint}$). In other variants, although not claimed in this application, it may also be an AS integrity key or a key derived from NAS-int or AS integrity key (Krrc_int) or a key derived from anyone of those keys. NAS-int is in many instances throughout the following text denoted Key-MAC CIoT DL. The use of NAS or AS key depends on if the MAC CIoT DL is calculated by the MME 4 or an eNB. Other alternative keys outside the scope of the claims of this application are root keys for the NAS-int, e.g. KASME in LTE and KAUSF, KSEAF and KAMF in New Radio systems.

Target cell's identity (cell-ID).

Source cell's physical cell identity.

UE's C-RNTI at the source cell.

constant (the constant allows differentiation of MAC CIoT from ShortResumeMAC-I and ShortMAC-I or a MAC defined in other ways.

a possibly input to the MAC CIoT DL calculation is an uplink, UL, authentication token, here called MAC CIoT UL (uplink).

a freshness parameter.

The input used for the calculation of the MAC CIoT DL will be denoted Input-MAC CIoT DL. The target cell's identity may thus be part of the Input-MAC CIoT DL, but the NAS integrity key may be separate from the Input-MAC-CIoT DL received by the UE, since it typically already has the NAS integrity key and used it for calculation of the MAC CIoT UL.

The function used for the calculation of the MAC CIoT DL (denoted Fun-MAC CIoT DL) may be the same used in Annex B.2 of TS 33.401 for RRC re-establishment and RRC resume, i.e. an integrity algorithm in the form of a NAS 128-bit integrity algorithm, which may be 128-EIA1, 128-EIA2 and 128-EIA3.

Figure 3A:
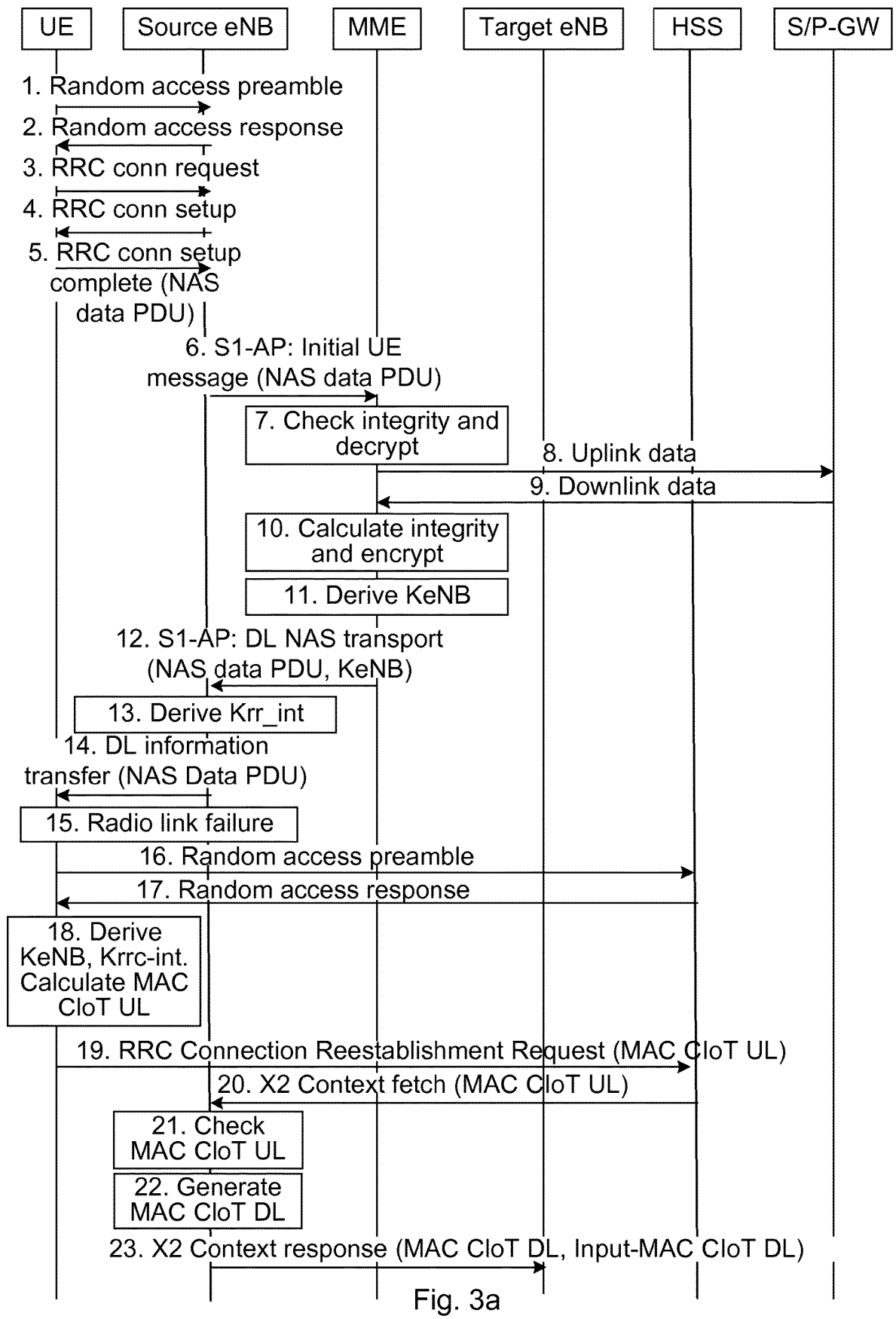
FIG. 3a schematically shows signalling according to a part of an embodiment presented herein.
Figure 3B:
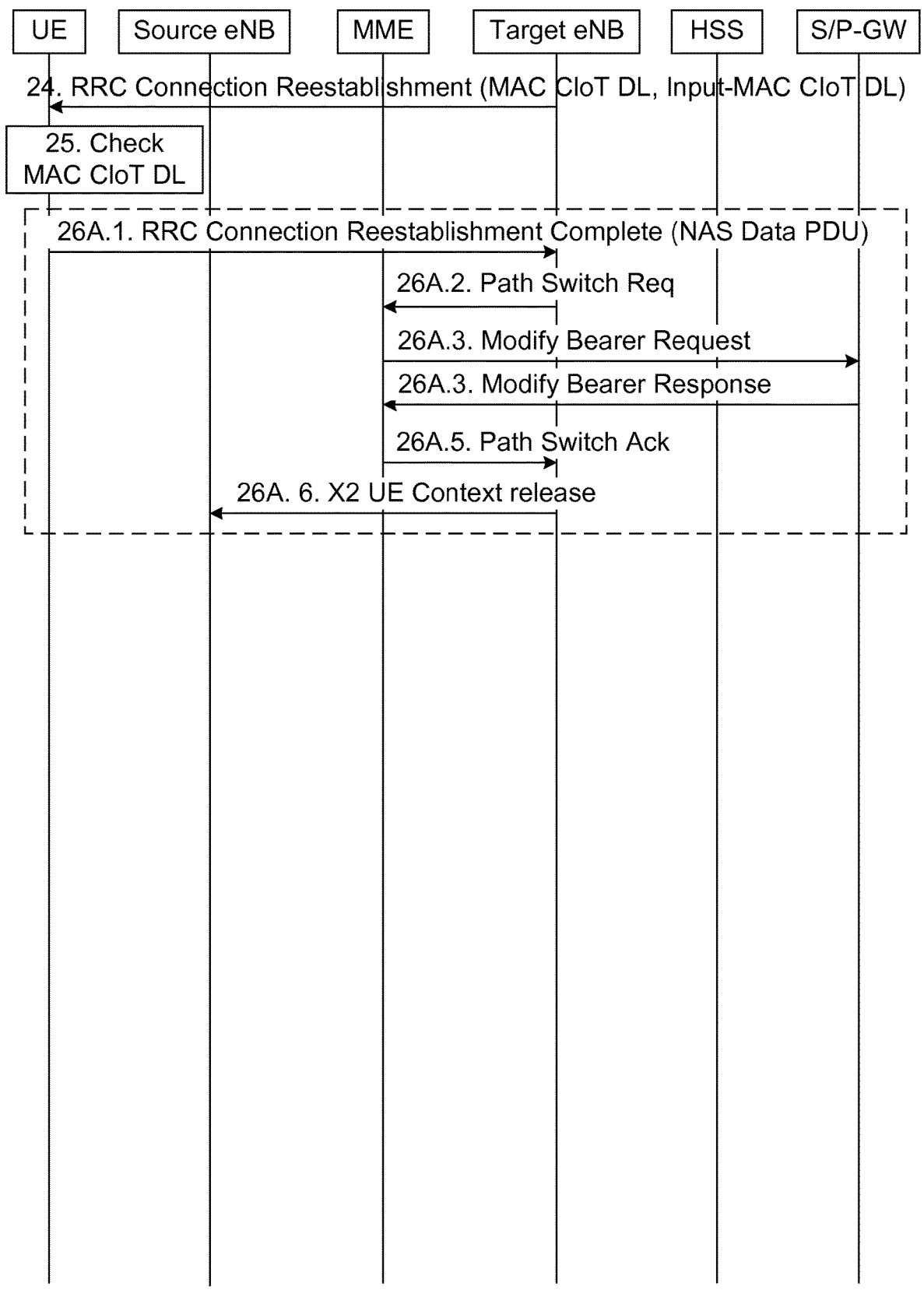

Variant 1a is illustrated in FIGS. 3a and 3b, wherein MAC CIoT DL is sent from the source eNB and is checked by the UE with an AS key (not within the scope of the claims of the application) or a NAS key.

This variant is based on a negotiation of AS algorithm via the NAS protocol and subsequent checking of the uplink token called MAC CIoT UL in the source eNB. The variant comprises a mechanism where the source eNB, after having checked MAC CIoT UL, generates a downlink token called MAC CIoT DL. The source eNB sends the MAC CIoT DL to the target eNB in an X2 UE context response message. The target eNB sends the MAC CIoT DL further to the UE in an RRC message for authentication checking. If the check of the MAC CIoT DL is successful, the UE knows that it is connected to an authentic eNB, and not to a fake eNB.

Steps 1 to 15 are as defined in current 3GPP specifications. The UE sets up an RRC connection and sends data over NAS, which is forwarded from MME to Serving-Gateway (S-GW)/Packet Data Network-Gateway (P-GW).

An RLF happens in step 15. The RLF can also happen before the UE has received DL data.

Step 16. The UE initiates an RRC connection by sending a Random Access message to a target eNB.

Step 17. The target eNB responses with Random Access Response to the UE.

Step 18. The UE generates an authentication token, MAC CIoT UL. The token may be calculated in the following way: token=f(source PCI, source C-RNTI, target Cell-ID, NAS key, replay input), where the NAS key is the current NAS integrity key, e.g. $K_{NASint}$, or is a derivative thereof. f=function. However, with respect to this particular variant 1a, the token could instead be derived by an AS key instead of the NAS key. The AS key may be an AS integrity key, such as $K_{RRCint}$.

Step 19. The UE sends an RRC connection reestablishment message to the target eNB, e.g. for CP IoT EPS (Evolved Packet System) optimization. The message includes the MAC CIoT UL.

Step 20. The target eNB sends an X2 UE context request message to the source eNB. The message includes the MAC CIoT UL.

Step 21. The source eNB checks if the MAC CIoT UL is authentic.

Step 22. If the authentication is successful, the source eNB generates MAC CIoT DL as described above using Input-MAC CIoT DL and the Key-MAC CIoT DL and processing continues in step 23. If the authentication fails, the source eNB sends an X2 UE context response indicating failure. The failure will trigger the target eNB to release the RRC connection (not illustrated).

Step 23. The source eNB sends an X2 UE context response to the target eNB. The message includes the MAC CIoT DL. The message may further include Input-MAC CIoT DL.

Step 24. The target eNB sends an RRC connection reestablishment message to the UE. The message includes the MAC CIoT DL. The message may further include Input-MAC CIoT DL.

Step 25. Upon receiving the RRC connection reestablishment message the UE authenticates the MAC CIoT DL using Input-MAC CIoT DL and the Key-MAC CIoT DL as described above.

Step 26A. If the MAC CIoT DL authentication is successful.
  26A.1 The UE sends an RRC Connection Reestablishment Complete message, optionally containing NAS Data PDU to the target eNB.
  26A.2.-26A.5. These steps are normal path switch and bearer modification procedures.
  26A.6. The target eNB now tells the source eNB to release the UE context by sending an X2 message called UE Context Release.

If the authentication of the MAC CIoT DL in step 25 fails, the UE may perform actions such as not sending further messages or transitioning to RRC_CONNECTED mode to authenticate the network, etc.

Figure 4A:
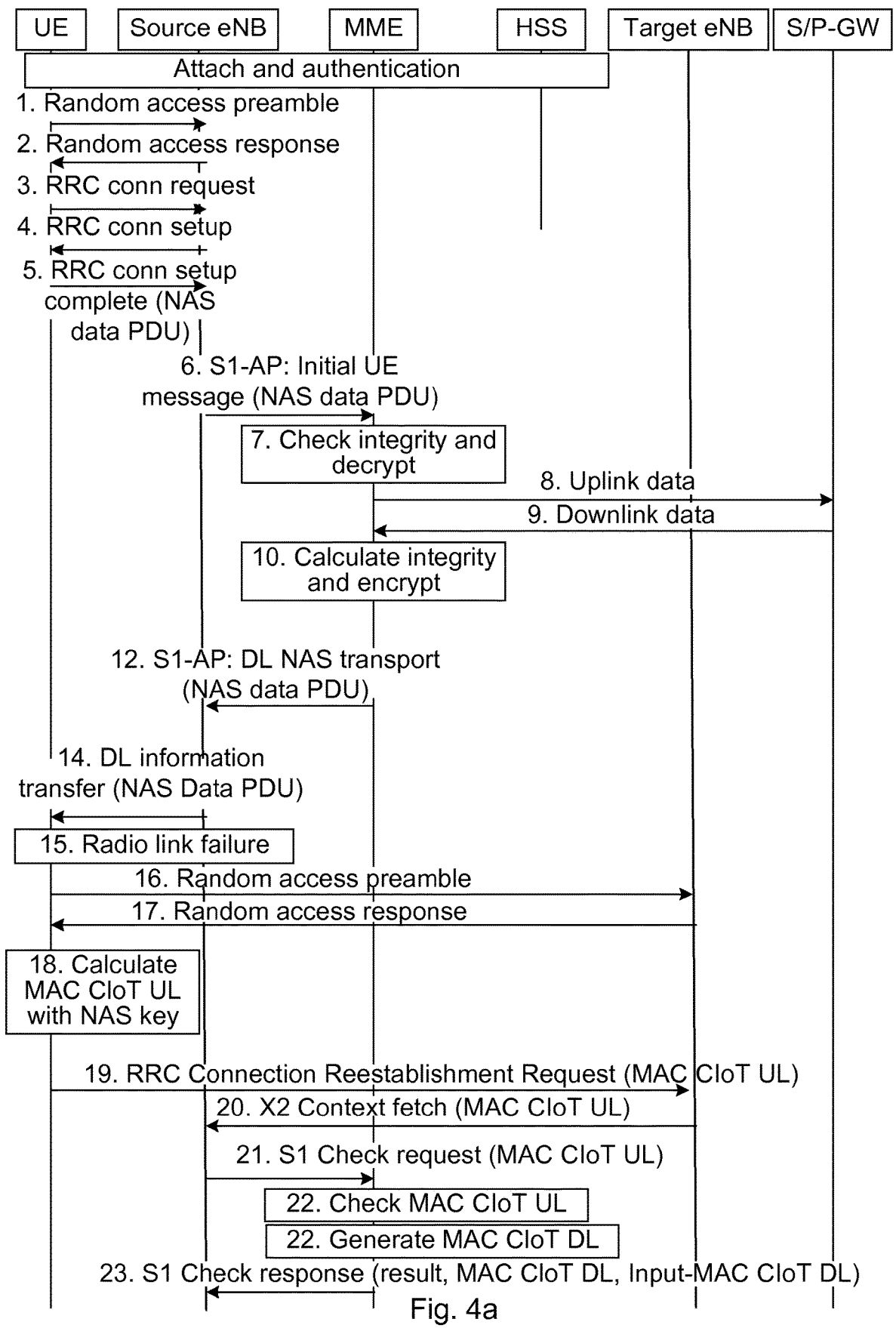
FIG. 4a schematically shows signalling according to a part of an embodiment presented herein.
Figure 4B:
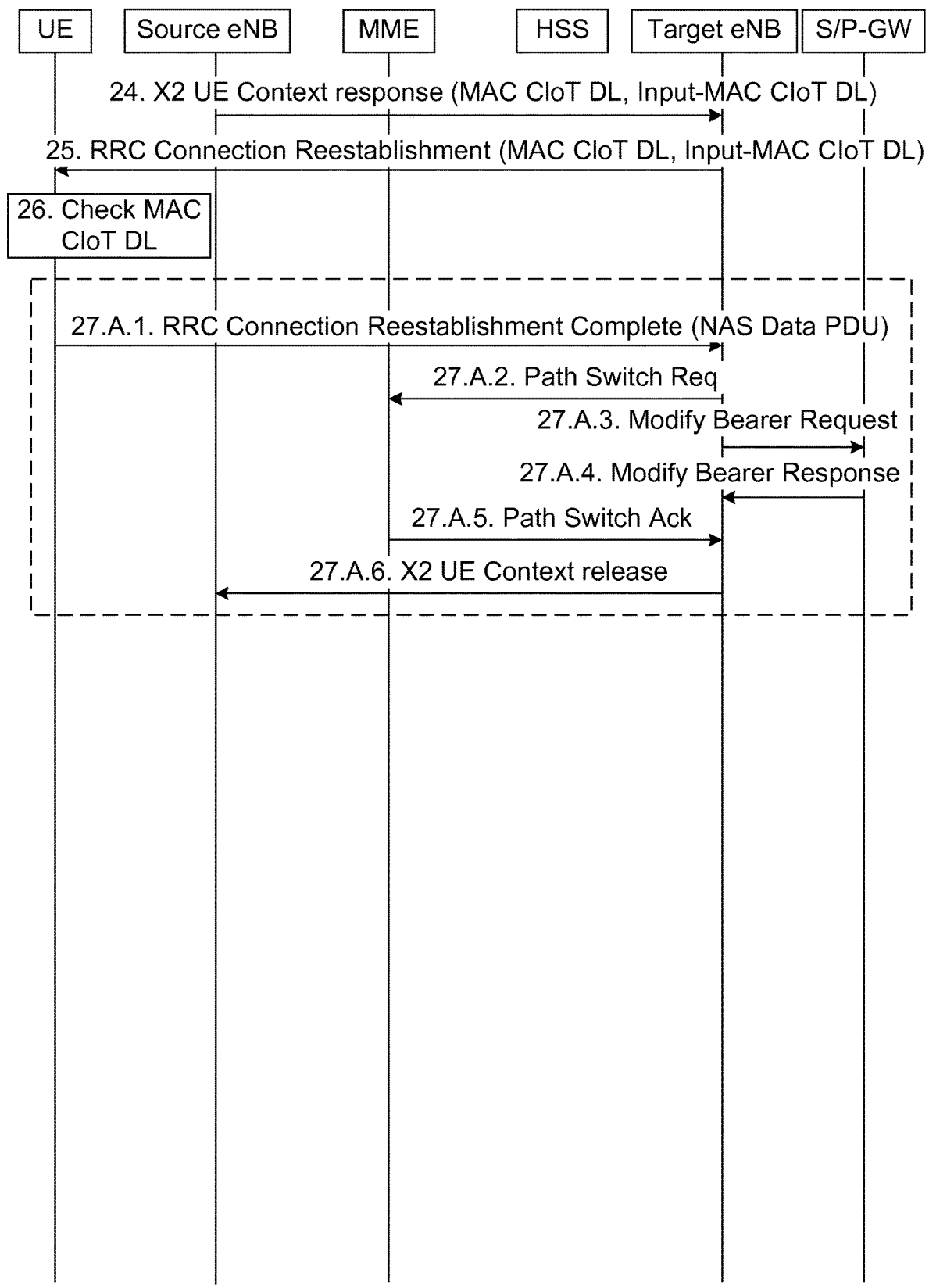

Variant 1b is illustrated in FIGS. 4a-4b, wherein MAC CIoT DL is sent from the MME to the source eNB and from source eNB to target eNB and from target eNB to the UE and then checked by the UE with a NAS key.

This is an example applicable to a situation where an RLF happens e.g. during sending of NAS data for CP CIoT optimizations.

Steps 1 to 18 are as defined in current 3GPP specifications.

Step 19. The UE sends an RRC message to the target eNB including the MAC CIoT UL. The RRC message may be an RRC connection reestablishment request, an RRC resume request, or some other RRC message.

Step 20. The target eNB sends an X2 message to the source eNB including the MAC CIoT UL. The X2 message may be an X2 context fetch message.

Step 21. The source eNB sends an S1 message to the MME including the MAC CIoT UL and Input-MAC CIoT UL.

Step 22. Upon receiving the MAC CIoT UL and Input-MAC CIoT UL, the MME verifies the MAC CIoT UL by performing the same calculation that the UE performed and comparing it with the received MAC CIoT UL. If the verification is successful, the MME generates MAC CIoT DL as described above using Input-MAC CIoT DL and the Key-MAC CIoT DL and processing continues in step 23, wherein the MME sends an St message indicating success to the source eNB and includes MAC CIoT DL. If the verification is not successful, the MME sends an St message indicating error to the source eNB. The source eNB then sends an X2 UE context response indicating failure. The failure will trigger the target eNB to release the RRC connection (not illustrated).

Step 23. The MME sends an S1 Check response message to the source eNB indicating success. The message includes the MAC CIoT DL. The message may further include Input-MAC CIoT DL.

Step 24. The source eNB sends an UE context response to the target eNB. The message includes the MAC CIoT DL. The message may further include Input-MAC CIoT DL.

Step 25. The target eNB sends an RRC connection reestablishment message to the UE. The message includes the MAC CIoT DL. The message may further include Input-MAC CIoT DL.

Step 26. Upon receiving the RRC connection reestablishment message the UE authenticates the MAC CIoT DL using Input-MAC CIoT DL and the Key-MAC CIoT DL as described above.

Step 27A. If the MAC CIoT DL authentication is successful
  27A.1. The UE sends an RRC Connection Reestablishment Complete message, optionally containing NAS Data PDU to the target eNB.
  27A.2.-27A.5. These steps are normal path switch and bearer modification procedures.
  27A.6. The target eNB now tells the source eNB to release the UE context by sending an X2 message called UE Context Release.

If the authentication of the MAC CIoT DL in step 25 fails, then the UE may perform actions such as not sending further messages or transitioning to RRC_CONNECTED mode to authenticate the network, etc.

Figure 5:
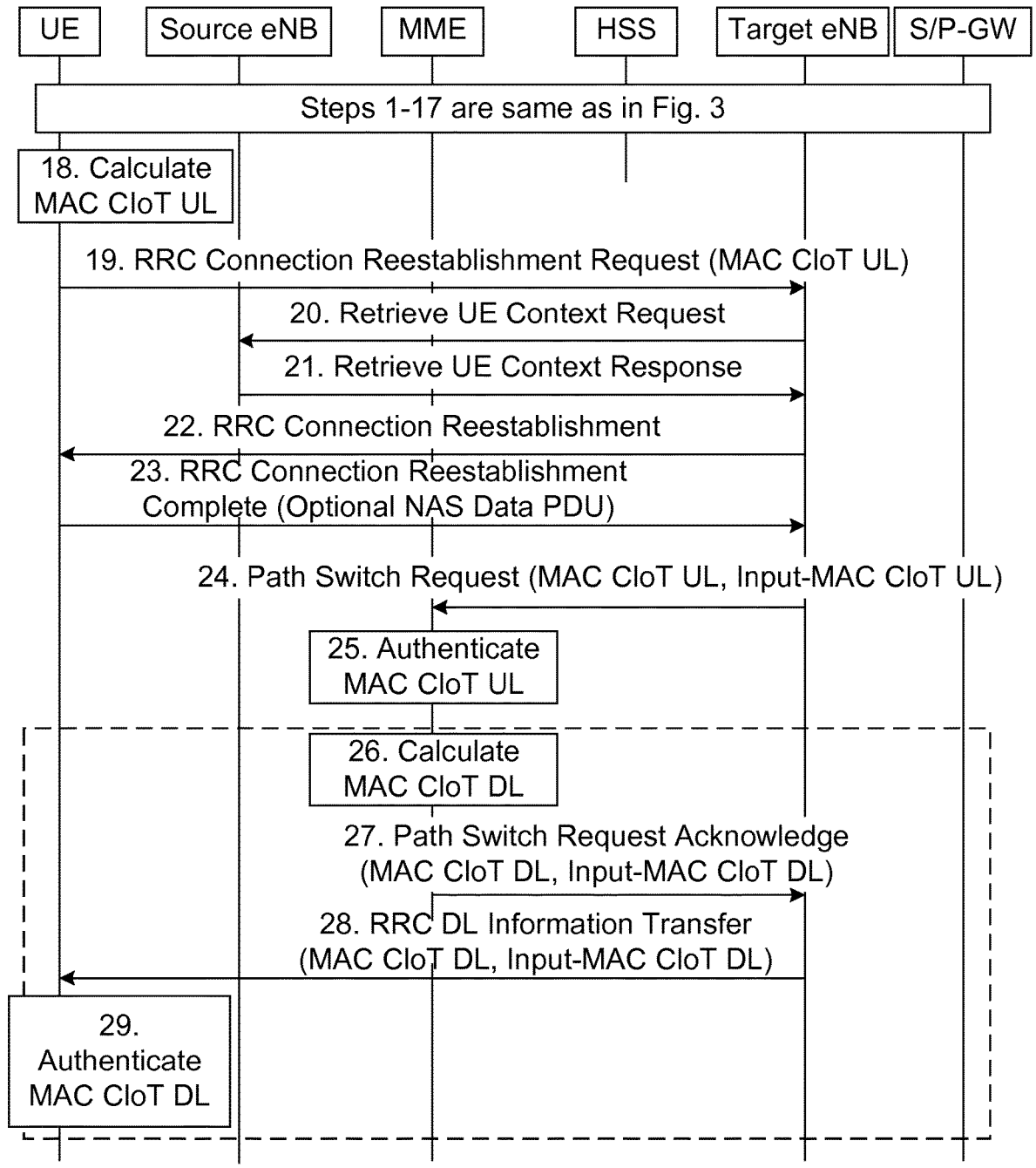
FIG. 5 schematically shows signalling according to an embodiment presented herein.

Variant 2a is illustrated in FIG. 5, wherein the MAC CIoT DL is sent from the MME to the target eNB in an S1AP Path Switch Request Acknowledgment message. The MAC CIoT DL is sent from the target eNB to the UE.

This variant is based on an existing S1AP message called Path Switch Request Acknowledgement which is sent from the MME to the target eNB. The Path Switch Request Acknowledgement is modified to be able to carry the MAC CIoT DL and Input-MAC CIoT DL. It should be obvious to the person skilled in the art that the order of the steps, messages, and fields could be altered; messages combined; fields put in different messages, etc; to achieve the same effect.

Steps 1-17 are the same as described above in connection with FIG. 3*a*.

Steps 18-19 are also the same as describe above in connection with FIG. 3*a*, but these are also shown in FIG. 5 for the completeness of the RRC Connection Reestablishment procedure.

Step 20. The target eNB requests the source eNB to send the UE's context. An existing X2 message called Retrieve UE Context Request may be adapted as necessary (e.g., using ReestabUE-Identity instead of ResumeIdentity).

Step 21. The source eNB sends the UE's context to the target eNB. An existing X2 message called Retrieve UE Context Response may be adapted as necessary.

Step 22. The target eNB sends an RRC Connection Reestablishment message to the UE.

Step 23. The UE sends an RRC Connection Reestablishment Complete message, optionally containing NAS Data PDU (Protocol Data Unit) to the target eNB.

Step 24. The target eNB sends a Path Switch Request to the MME. In the Path Switch Request, the target eNB includes MAC CIoT UL and Input-MAC CIoT UL. As stated above, the Input-MAC CIoT UL may include the target cell's identity. The target eNB received the MAC CIoT UL in Step 19. The Input-MAC CIoT UL may include information that the target eNB received in step 19 and/or step 21, and/or the target eNB's own information. The Path Switch Request may contain the UE's information that enables the MME to identify the UE's context in the MME. That UE's information is today called "Source MME UE S1AP ID" which the target eNB is able to provide from the information it received in step 23.

Step 25. The MME authenticates the MAC CIoT UL, e.g. by using the Input-MAC CIoT UL and the Key-MAC CIoT UL as input to the Fun-MAC CIoT UL. The Key-MAC CIoT UL is in an embodiment the same as the Key-MAC CIoT DL, i.e. the NAS integrity key which may be derived separately by the MME and the UE respectively based on KASME, as is known to the person skilled in the art.

In the following, for simplicity, only the steps relevant for the present solution are described further, which are—if the authentication in step 25 succeeds:

Step 26. The MME generates MAC CIoT DL as described above using Input-MAC CIoT DL and the Key-MAC CIoT DL. Some elements of the Input-MAC CIoT DL, like the target cell's identity (cell-ID), may be obtained from the Input-MAC CIoT UL.

Step 27. The MME sends an S1 message, Path Switch Request Acknowledge message, indicating success to the target eNB and the Path Switch Request Acknowledge message is adapted to include MAC CIoT DL and Input-MAC CIoT DL.

Step 28. The target eNB now knows that the MAC CIoT UL sent by the UE and mentioned in earlier steps is authentic. The target eNB sends the MAC CIoT DL and Input-MAC CIoT DL to the UE in an RRC message, for example by putting them in the DedicatedInfoNAS field of the DLInformationTransfer message of the RRC DL Information Transfer procedure. A new kind of RRC procedure may also be introduced for this particular purpose of conveying the MAC CIoT DL to the UE, e.g. RRC Reestablishment Confirm.

Step 29. The UE authenticates the MAC CIoT DL using the Input-MAC CIoT DL and the Key-MAC CIoT DL as input to the Fun-MAC CIoT DL.

If the authentication of the MAC CIoT DL in step 27 fails, then the UE may perform actions such as not sending further messages or transitioning to RRC_CONNECTED mode to authenticate the network, etc.

Figure 6:
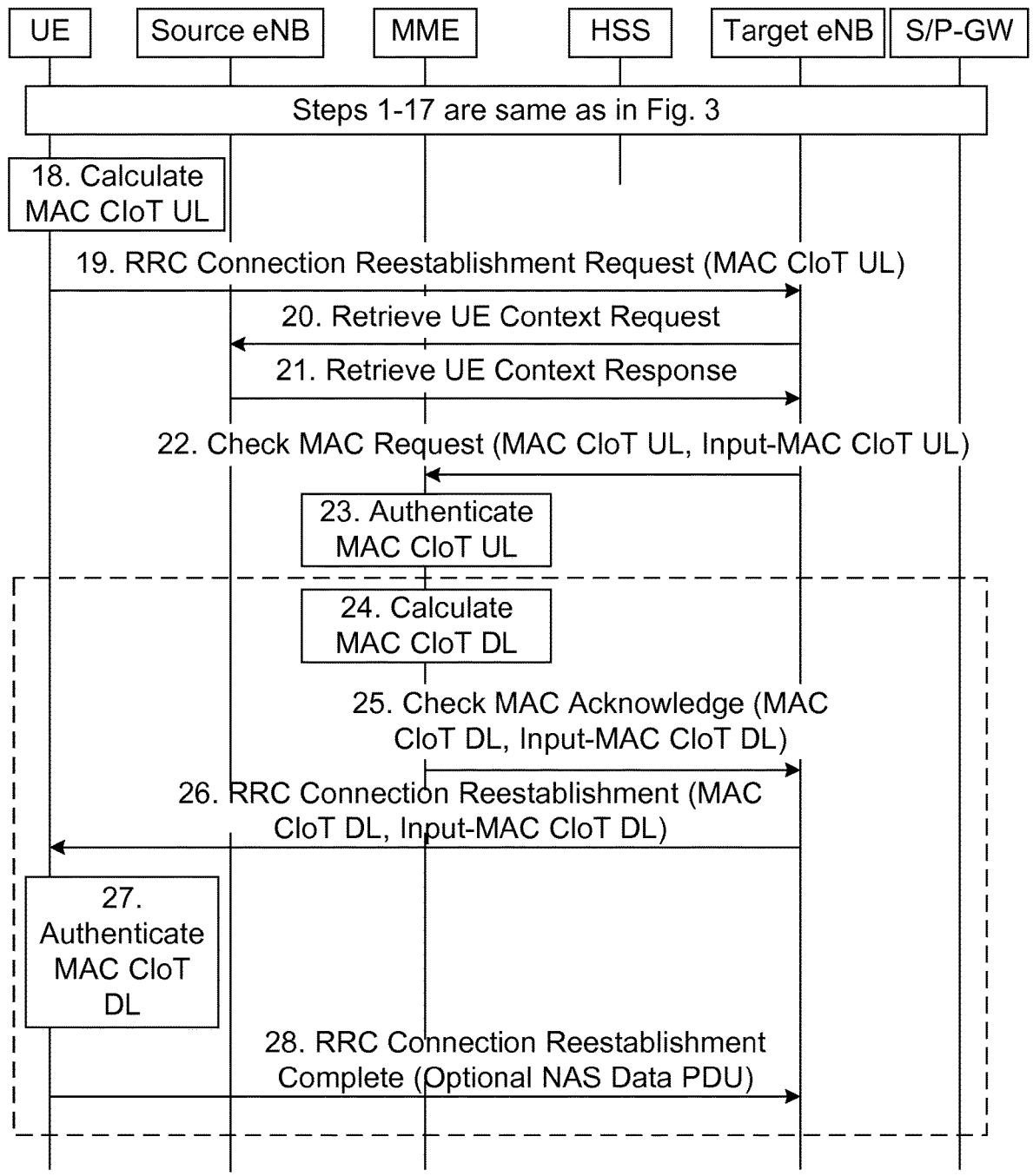
FIG. 6 schematically shows signalling according to an embodiment presented herein.

Variant 2b is illustrated in FIG. 6, wherein the MAC CIoT DL is sent from the MME to the target eNB in a new S1AP message and from the target eNB to the UE.

This variant is based on a new S1AP message (denoted Check MAC Request) which is sent from the target eNB to the MME. The Check MAC Request message is able to carry the MAC CIoT UL and Input-MAC CIoT UL.

Similarly, new S1AP messages, denoted Check MAC Acknowledge and Check MAC Failure, which are sent from the MME to the target eNB are used to respectively indicate that the MAC CIoT UL was authentic or not-authentic. The new S1AP message Check MAC Acknowledge carries the MAC CIoT DL and Input-MAC CIoT DL from the MME to the target eNB. The target eNB includes the MAC CIoT DL and Input-MAC CIoT DL to the UE in an RRC Connection Reestablishment message. It should be obvious to a person skilled in the art to notice that the order of the steps, messages, fields could be altered; messages combined; fields put in different messages, etc. to achieve the same effect.

Steps 1-17 are same as discussed above in connection with FIG. 3.

Steps 18-19 are also same as discussed above, but are illustrated for the completeness of the RRC Connection Reestablishment procedure.

Step 20. The target eNB requests the source eNB to send the UE's context. An existing X2 message called Retrieve UE Context Request may be adapted as necessary e.g., using ReestabUE-Identity instead of ResumeIdentity.

Step 21. The source eNB sends the UE's context to the target eNB. An existing X2 message called Retrieve UE Context Response may be adapted as necessary. The UE's context tells the target eNB the corresponding MME that the UE is registered at.

Step 22. The target eNB sends a message in the form of a Check MAC Request to the MME identified in step 21. In the Check MAC Request, the target eNB includes MAC CIoT UL and Input-MAC CIoT UL. The target eNB received the MAC CIoT UL in step 19. The Input-MAC CIoT UL may include information that the target eNB received in step 19 and/or step 21, and/or the target eNB's own information Such information included in the Input-MAC CIoT UL may be the target cell's identity, which thus has been used as input together with at least the NAS integrity key to generate the UL authentication token MAC CIoT UL. The Check MAC Request may also contain UE's information that enables the MME to identify the UE's context in the MME.

That UE's information may for example be the MME UE S1AP ID that the target eNB received from the source eNB in step 21.

Step 23. The MME authenticates the MAC CIoT UL using the Input-MAC CIoT UL and the Key-MAC CIoT UL (e.g. the same NAS integrity key used as Key-MAC CIoT DL) as input to the Fun-MAC CIoT UL. In other words, the result of the Fun-MAC CIoT UL is compared with the received MAC CIoT UL for a verification of the received MAC CIoT UL.

In the following, for simplicity, only the steps relevant for this variant are described further, which are—if the authentication in step 23 succeeds:

Step 24. The MME generates MAC CIoT DL as described above using the Input-MAC CIoT DL and the Key-MAC CIoT DL. Some elements of the Input-MAC CIoT DL, like the target cell's identity, may be obtained from the Input-MAC CIoT UL. The MME sends an St message (Check MAC Acknowledge message) indicating success to the target eNB and includes MAC CIoT DL and Input-MAC CIoT DL.

Step 25. The MME sends a Check MAC Request Acknowledge message to the target eNB. The message includes the MAC CIoT DL, and optionally also Input-MAC CIoT DL. The target eNB now knows that the MAC CIoT UL mentioned in earlier steps is authentic.

Step 26. The target eNB sends an RRC Connection Reestablishment message to the UE. This message includes the MAC CIoT DL and may include Input-MAC CIoT DL.

Step 27. The UE authenticates the MAC CIoT DL using the Input-MAC CIoT DL and the Key-MAC CIoT DL as input to the Fun-MAC CIoT DL.

Step 28. If the authentication of MAC CIoT DL in step 27 is successful then the UE sends an RRC Connection Reestablishment Complete message, optionally containing NAS Data PDU to the target eNB.

If the authentication of the MAC CIoT DL in step 27 fails, then the UE may perform some actions such as not sending further messages or transitioning to RRC_CONNECTED mode to authenticate the network, etc.

Figure 7A:
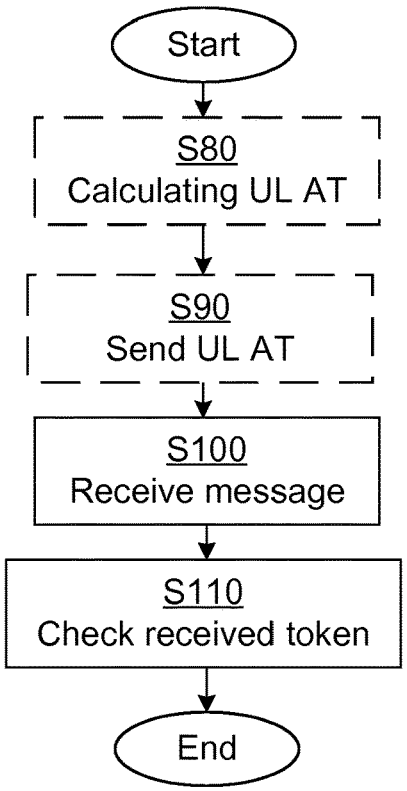
FIGS. 7A-7D are flow charts illustrating methods according to embodiments presented herein.

A method, according to an embodiment, for re-establishing an RRC connection between a UE and a target eNB is presented with reference to FIG. 7A. The method is performed by the UE 1 and comprises receiving S100 an RRC Connection Reestablishment message from a target eNB 3, e.g. for CP IoT optimization, the RRC Connection Reestablishment message including a DL authentication token which has been generated by the MME 4 and has had a NAS integrity key as input, and authenticating S110 the received DL authentication token.

The RRC Connection Reestablishment message including the DL authentication token may optionally also include an Input-MAC CIoT DL, and the received DL authentication token may be authenticated by using the received Input-MAC CIoT DL and the NAS integrity key.

The RRC message may be an RRC DL Information Transfer message including MAC CIoT DL and optionally Input-MAC CIoT DL, and the received MAC CIoT DL may be authenticated by using Input-MAC CIoT DL and key-MAC CIoT DL.

In an optional step S80 before S100, the UE calculates a UL authentication token (referred to as UL AT in FIG. 7A) with the NAS integrity key as input, and in an optional step S90 sends an RRC connection reestablishment request including the UL authentication token to the target eNB 3. The UL authentication token may be calculated with the target cell's identity as input and the target cell's identity may be included in the RRC connection reestablishment request, e.g. as a part of an Input-MAC UL.

Figure 7B:
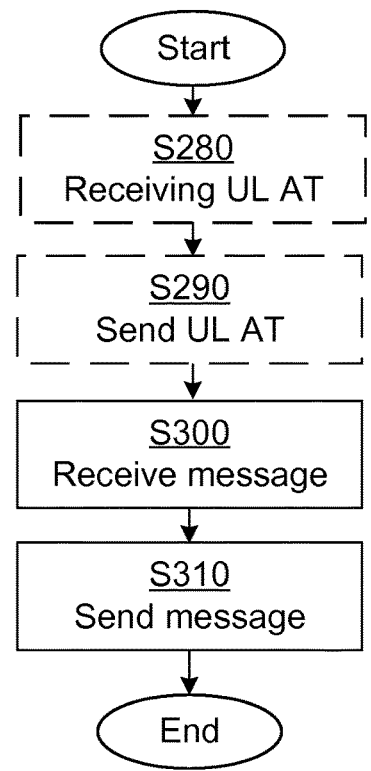

A method, according to an embodiment, for re-establishing a RRC connection between a UE and a target eNB, e.g. for CP IoT optimization, is presented with reference to FIG. 7B. The method is performed by the target eNB 3 and comprises receiving S300, from the MME 4, a message including a DL authentication token that has been generated by the MME, wherein the DL authentication token has been generated with a Non Access Stratum integrity key as input, and sending S310 an RRC Connection Reestablishment message to the UE 1, the RRC Connection Reestablishment message including the DL authentication token.

In an optional step S280 before S300, the target eNB receives from the UE 1 an RRC connection reestablishment request which includes a UL authentication token, wherein the UL authentication token has been calculated by the UE 1 with the NAS integrity key as input. The UL authentication token, in one embodiment together with the Input-MAC CIoT UL including the target cell's identity. In an optional step S290 before S300, the target eNB sends/forwards the UL authentication token to the MME 4, optionally with the Input-MAC CIoT UL including the target cell's identity.

The sent RRC Connection Reestablishment message may include an Input-MAC CIoT DL.

The received message may be a Patch Switch Request Acknowledge message including Input-MAC CIoT DL.

The received message may be a Check MAC Acknowledge message including and Input-MAC CIoT DL.

Figure 7C:
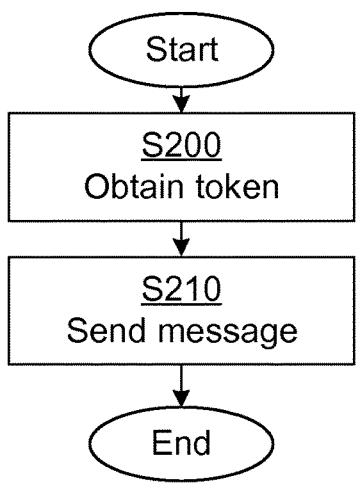

A method, according to an embodiment, for re-establishing a RRC connection between a UE and a target eNB, e.g. for CP IoT optimization, is presented with reference to FIG. 7C. The method is performed in a source eNB 2 and comprises obtaining S200 a DL authentication token that has been generated with a NAS integrity key as input, and sending S210 a response message to a target eNB 3, the response message including the obtained DL authentication token.

The obtaining S200 may comprise generating the DL authentication token, or receiving an S1 Check response message from an MME 4, the received S1 Check response including the DL authentication token and optionally also Input-MAC CIoT DL.

The response message may be an X2 UE Context response message.

Figure 7D:
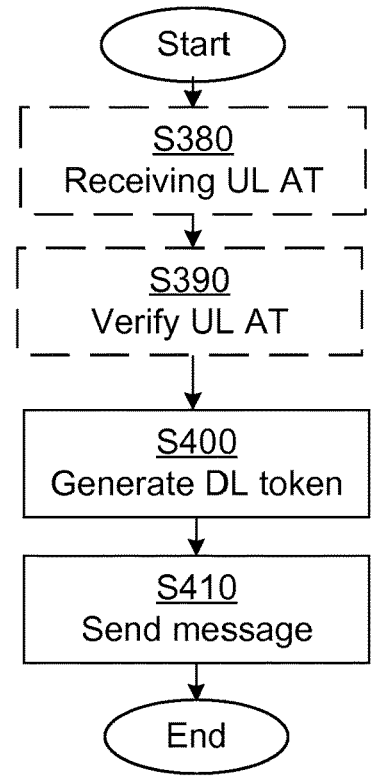

A method, according to an embodiment, for re-establishing a RRC connection between a UE and a target eNB, e.g. for CP IoT optimization, is presented with reference to FIG. 7D. The method is performed by the MME 4 and comprises generating S400 a DL authentication token with a NAS integrity key as input, and sending S410 a message including the generated DL authentication token to the target eNB 3. The DL authentication token may be generated with also the target cell's identity as input.

In an optional step S380 before S400, the MME receives an UL authentication token from the target eNB 3, said UL authentication token having been generated by the UE 1 with the NAS integrity key as input, and in an optional step S390 verifies the UL authentication token, e.g. by calculating a second UL authentication token in the same way as the UE did (e.g. with the NAS integrity key and the target cell's identity as input) and then comparing the second UL authentication token with the one received from the target eNB.

The message may be a Path Switch Request Acknowledge message and includes Input-MAC CIoT DL.

The message may be a Check MAC Acknowledge message including Input-MAC CIoT DL.

Figure 8:
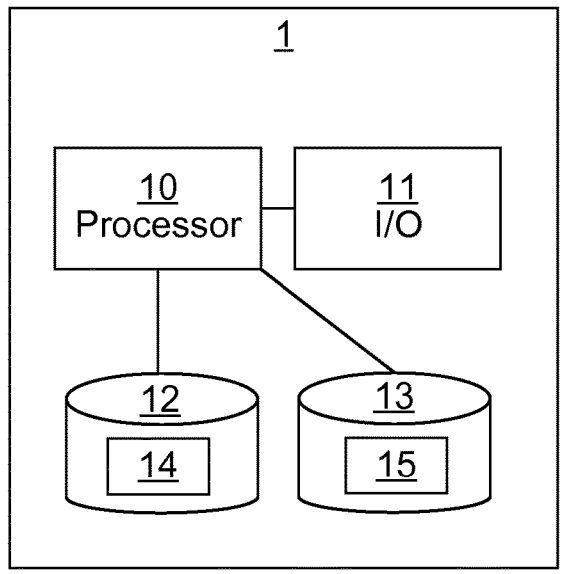
FIGS. 8-11 are schematic diagrams illustrating some components of entities presented herein.

A UE 1, according to an embodiment, for re-establishing a RRC connection between the UE 1 and the target eNB 3, is presented with reference to FIG. 8. The UE 1 comprises a processor 10 and a computer program product. The computer program product stores instructions that, when executed by the processor, causes the UE to receive an RRC Connection Reestablishment message from a target eNB 3, the RRC Connection Reestablishment message including a DL authentication token which has been generated by the MME 4 and has had a NAS integrity key as input, and authenticate the received DL authentication token.

The RRC Connection Reestablishment message may optionally include Input-MAC CIoT DL, and the received DL authentication token may be authenticated by using Input-MAC CIoT DL and the NAS integrity key.

Figure 9:
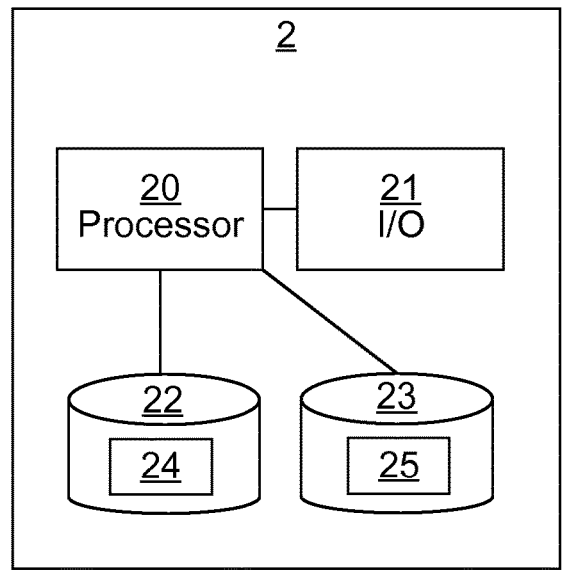

A source eNB, according to an embodiment, for re-establishing a RRC connection between a UE 1 and a target eNB 3, is presented with reference to FIG. 9. The source eNB 2 comprises a processor 20 and a computer program product. The computer program product stores instructions that, when executed by the processor, causes the source eNB to obtain a DL authentication token that has been generated with a NAS integrity key as input, and send a response message to the target eNB 3, the response message including the obtained DL authentication token.

The response message may be an X2 UE Context response message.

Figure 10:
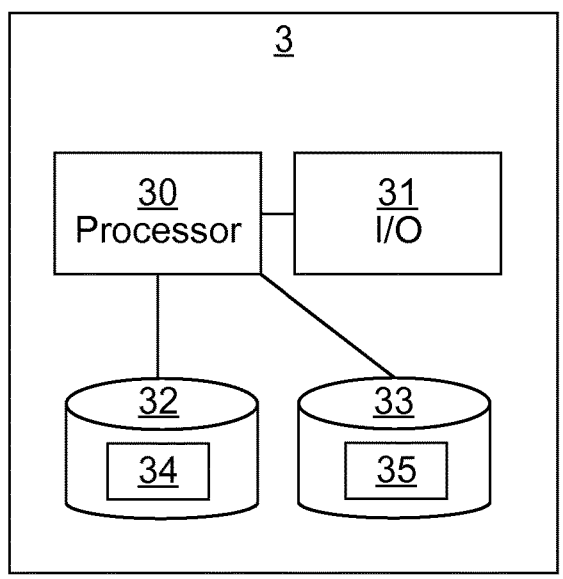

A target eNB, according to an embodiment, for re-establishing a RRC connection between a UE 1 and a target eNB 3, is presented with reference to FIG. 10. The target eNB 3 comprises a processor 30 and a computer program product. The computer program produce stores instructions that, when executed by the processor, causes the target eNB to receive from the MME 4 a message including a DL authentication token that has been generated by the MME 4, wherein the DL authentication token has been generated with a NAS integrity key as input; and send an RRC Connection Reestablishment message to a UE 1, the RRC Connection Reestablishment message including the DL authentication token. The DL authentication token has in one embodiment been calculated by the MME 4 with a target cell's identity as input.

The sent RRC Connection Reestablishment message is optionally including Input-MAC CIoT DL, which may include the target cell's identity.

The received message may be a Patch Switch Request Acknowledge message including the Input-MAC CIoT DL.

The received message may be a Check MAC Acknowledge message including Input-MAC CIoT DL.

Figure 11:
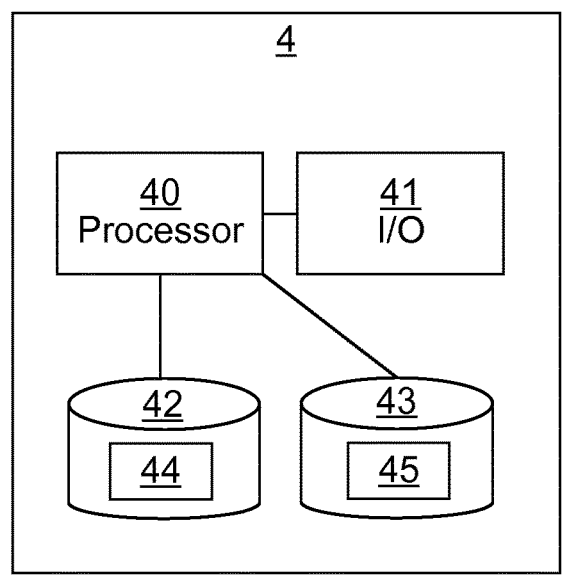

A MME, according to an embodiment, for re-establishing a RRC connection between a UE 1 and a target eNB 3, is presented with reference to FIG. 11. The MME 4 comprises a processor 40 and a computer program product. The computer program product stores instructions that, when executed by the processor, causes the MME to generate a DL authentication token with a NAS integrity key as input, and to send a message including the generated DL authentication token to the target eNB 3.

The message may be a Path Switch Request Acknowledge message, the message including an Input-MAC CIoT DL.

The message may be a Check MAC Acknowledge message, the message including the Input-MAC CIoT DL.

FIG. 8 is a schematic diagram showing some components of the UE 1. The processor to may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor to may be configured to execute methods described herein with reference to FIG. 7A.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the UE 1.

The UE 1 may further comprise an input/output (I/O) interface ii including e.g. a user interface. The UE 1 may further comprise a receiver configured to receive signalling from other nodes, and a transmitter configured to transmit signalling to other nodes (not illustrated). Other components of the UE 1 are omitted in order not to obscure the concepts presented herein.

Figure 12:
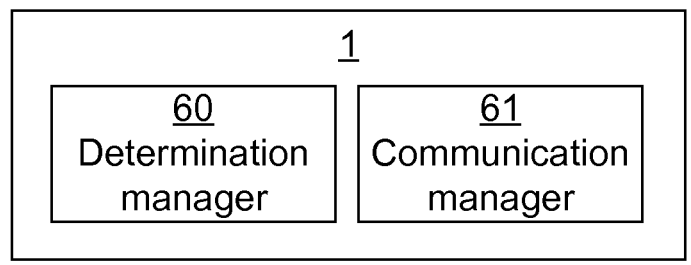
FIGS. 12-15 are schematic diagrams showing functional modules of embodiments presented herein.

FIG. 12 is a schematic diagram showing functional blocks of the UE 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 7A, comprising a determination manager unit 60 and a communication manager unit 61. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 60 is for enabling re-establishing a RRC connection between a UE and a target eNB. This module corresponds to the check step S110 of FIG. 7A, i.e. the authentication of the received DL authentication token. This module can e.g. be implemented by the processor 10 of FIG. 8, when running the computer program.

The communication manger 61 is for enabling re-establishing a RRC connection between a UE and a target eNB. This module corresponds to the receive step S100 of FIG. 7A. This module can e.g. be implemented by the processor 10 of FIG. 12, when running the computer program.

FIG. 9 is a schematic diagram showing some components of the source eNB 2. The processor 20 may be provided using any combination of one or more of a suitable central processing unit, CPU, multiprocessor, microcontroller, digital signal processor, DSP, application specific integrated circuit etc., capable of executing software instructions of a computer program 24 stored in a memory. The memory can thus be considered to be or form part of the computer program product 22. The processor 20 may be configured to execute methods described herein with reference to FIG. 7B.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 23 in the form of a data memory may also be provided, e.g. for reading and/or storing data during execution of software instructions in the processor 20. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 25, to improve functionality for the source eNB 2.

The source eNB 2 may further comprise an input/output (I/O) interface 21 including e.g. a user interface. The source eNB 2 may further comprise a receiver configured to receive signalling from other nodes, and a transmitter configured to transmit signalling to other nodes (not illustrated). Other components of the source eNB 2 are omitted in order not to obscure the concepts presented herein.

Figure 13:
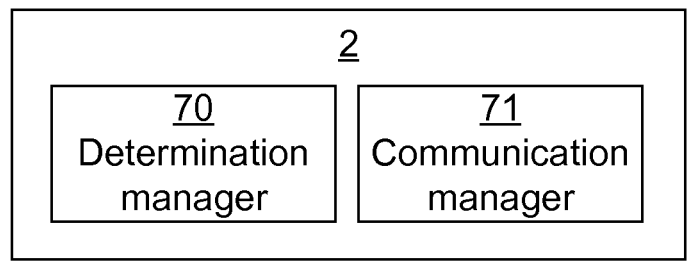

FIG. 13 is a schematic diagram showing functional blocks of the source eNB 2. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 7C, comprising a determination manager unit 70 and a communication manager unit 71. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 70 is for enabling re-establishing a RRC connection between a UE and a target eNB. This module corresponds to the obtain step S200 of FIG. 7C. This module can e.g. be implemented by the processor 20 of FIG. 9, when running the computer program.

The communication manger 71 is for enabling re-establishing a RRC connection between a UE and a target eNB. This module corresponds to the send step S210 of FIG. 7C. This module can e.g. be implemented by the processor 20 of FIG. 13, when running the computer program.

FIG. 10 is a schematic diagram showing some components of the target eNB 3. The processor 30 may be provided using any combination of one or more of a suitable central processing unit, CPU, multiprocessor, microcontroller, digital signal processor, DSP, application specific integrated circuit etc., capable of executing software instructions of a computer program 34 stored in a memory. The memory can thus be considered to be or form part of the computer program product 32. The processor 30 may be configured to execute methods described herein with reference to FIG. 7C.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 33 in the form of a data memory may also be provided, e.g. for reading and/or storing data during execution of software instructions in the processor 30. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 35, to improve functionality for the target eNB 3.

The target eNB 3 may further comprise an input/output (I/O) interface 31 including e.g. a user interface. The target eNB 3 may further comprise a receiver configured to receive signalling from other nodes, and a transmitter configured to transmit signalling to other nodes (not illustrated). Other components of the target eNB 3 are omitted in order not to obscure the concepts presented herein.

Figure 14:
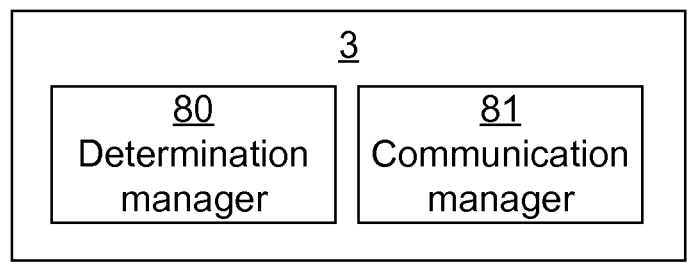

FIG. 14 is a schematic diagram showing functional blocks of the target eNB 3. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 7B, comprising a determination manager unit 80 and a communication manager unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manger 81 is for enabling re-establishing a RRC connection between a UE and a target eNB. This module corresponds to the receive step S300 and the send step 310 of FIG. 7B. This module can e.g. be implemented by the processor 30 of FIG. 10, when running the computer program.

FIG. 11 is a schematic diagram showing some components of the MME 4. The processor 40 may be provided using any combination of one or more of a suitable central processing unit, CPU, multiprocessor, microcontroller, digital signal processor, DSP, application specific integrated circuit etc., capable of executing software instructions of a computer program 44 stored in a memory. The memory can thus be considered to be or form part of the computer program product 42. The processor 40 may be configured to execute methods described herein with reference to FIG. 7D.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 43 in the form of a data memory may also be provided, e.g. for reading and/or storing data during execution of software instructions in the processor 40. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 45, to improve functionality for the MME 4.

The MME 4 may further comprise an input/output (I/O) interface 41 including e.g. a user interface. The MME 4 may further comprise a receiver configured to receive signalling from other nodes, and a transmitter configured to transmit signalling to other nodes (not illustrated). Other components of the MME 4 are omitted in order not to obscure the concepts presented herein.

Figure 15:
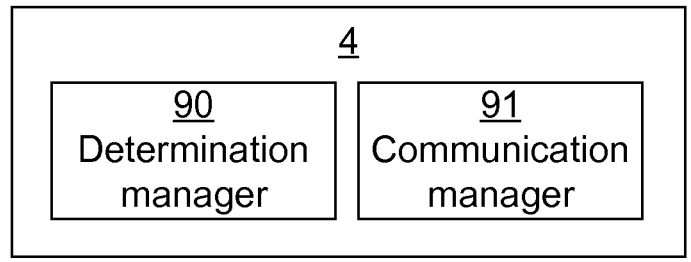

FIG. 15 is a schematic diagram showing functional blocks of the MME 4. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 7D, comprising a determination manager unit 90 and a communication manager unit 91. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 90 is for enabling re-establishing a RRC connection between a UE and a target eNB. This module corresponds to the generate step 400 of FIG. 7D. This module can e.g. be implemented by the processor 40 of FIG. 11, when running the computer program.

The communication manger 91 is for enabling re-establishing a RRC connection between a UE and a target eNB. This module corresponds to the send step S410 of FIG. 7D. This module can e.g. be implemented by the processor 40 of FIG. 11, when running the computer program.

The invention has mainly been described above with reference to a few embodiments. However, as is readily appreciated by a person skilled in the art, other embodiments than the ones disclosed above are equally possible within the scope of the invention, as defined by the appended itemized list of embodiments.

The invention claimed is:

1. A method for re-establishing a Radio Resource Control (RRC) connection between a User Equipment (UE) and a target evolved NodeB (eNB), the method comprising:
    the UE receiving an RRC Connection Reestablishment message from the target eNB, the RRC Connection Reestablishment message including a downlink (DL) authentication token which was calculated by a Mobility Management Entity (MME) using an integrity algorithm and a set of input parameters, wherein the set of input parameters includes a Non Access Stratum (NAS) integrity key; and
    the UE authenticating the received DL authentication token, wherein authenticating the received DL authentication token comprises the UE comparing the received DL authentication token to a token calculated by the UE using said integrity algorithm and said set of input parameters.

2. The method according to claim 1, further comprising calculating an uplink (UL) authentication token with the Non Access Stratum integrity key as input, and sending an RRC connection reestablishment request including the UL authentication token to the target eNB.

3. The method according to claim 2, wherein the UL authentication token is calculated with a target cell's identity as input.

4. The method according to claim 3, further comprising including the target cell's identity in the RRC connection reestablishment request.

5. The method according to claim 1, wherein the set of input parameters further includes a target cell's identity.

6. The method according to claim 1, wherein the RRC Connection Reestablishment message includes Input MAC CIoT DL, and authenticating the received DL authentication token by using the Input-MAC CIoT DL and the Non Access Stratum integrity key.

7. A method for re-establishing a Radio Resource Control (RRC) connection between a User Equipment (UE) and a target evolved NodeB (eNB), the method being performed by the target eNB and comprising:
    receiving, from a Mobility Management Entity (MME), a message including a downlink (DL) authentication token that was calculated by the MME using an integrity algorithm and a set of input parameters, wherein the set of input parameters includes a Non Access Stratum (NAS) integrity key; and
    sending an RRC Connection Reestablishment message to the UE, the RRC Connection Reestablishment message including the DL authentication token.

8. The method according to claim 7, further comprising receiving from the UE an RRC connection reestablishment request which includes an uplink (UL) authentication token, wherein the UL authentication token has been calculated by the UE with the Non Access Stratum integrity key as input.

9. The method according to claim 8, wherein the UL authentication token has been calculated by the UE with a target cell's identity as input.

10. The method according to claim 7, wherein the set of input parameters further includes a target cell's identity as input.

11. The method according to claim 7, wherein the RRC Connection Reestablishment message includes an Input MAC CIoT DL.

12. The method according to claim 7, wherein the received message is a Patch Switch Request Acknowledge message and includes Input-MAC CIoT DL.

13. The method according to claim 7, wherein the received message is a Check MAC Acknowledge message and includes Input-MAC CIoT DL.

14. A method for re-establishing a Radio Resource Control (RRC) connection between a User Equipment (UE) and a target evolved NodeB (eNB), the method being performed by a Mobility Management Entity (MME) and comprising:
    calculating a downlink (DL) authentication token using an integrity algorithm and a set of input parameters, wherein the set of input parameters includes a Non Access Stratum (NAS) integrity; and
    sending a message including the calculated DL authentication token to the target eNB.

15. The method according to claim 14, wherein the set of input parameters further includes a target cell's identity as input.

16. The method according to claim 14, further comprising receiving an uplink (UL) authentication token from the target eNB, said UL authentication token having been generated by the UE with the Non Access Stratum integrity key as input, and
    verifying the UL authentication token.

17. The method according to claim 16, wherein the UL authentication token has been generated by the UE with a target cell's identity as input.

18. The method according to claim 14, wherein the message is a Path Switch Request Acknowledge message and includes Input-MAC CIoT DL.

19. The method according to claim 14, wherein the message is a Check MAC Acknowledge message and includes Input-MAC CIoT DL.

20. A User Equipment (UE) for re-establishing a Radio Resource Control (RRC) connection between the UE and a target evolved NodeB (eNB), the UE comprising:
    a processor; and
    a computer program product storing instructions that, when executed by the processor, causes the UE to:

process an RRC Connection Reestablishment message transmitted by the target eNB and received at the UE, the RRC Connection Reestablishment message including a downlink (DL) authentication token which was calculated by a Mobility Management Entity (MME) using an integrity algorithm and a set of input parameters, wherein the set of input parameters includes a Non Access Stratum (NAS) integrity key; and compare the received DL authentication token to a token calculated by the UE using said integrity algorithm and said set of input parameters to authenticate the received DL authentication.

21. The UE according to claim 20, wherein the RRC Connection Reestablishment message includes Input-MAC CIoT DL, and the received DL authentication token is authenticated by using the Input-MAC CIoT DL and the Non Access Stratum integrity key.

22. The UE according to claim 20, wherein the set of input parameters further includes a target cell's identity.

23. A target evolved Node B (eNB), for re-establishing a Radio Resource Control (RRC) connection between a User Equipment (UE) and the target eNB, the target eNB comprising:

a processor; and a computer program product storing instructions that, when executed by the processor, causes the target eNB to:

process a message transmitted by a Mobility Management Entity (MME) and received at the target eNB, the message including a downlink (DL) authentication token that was calculated by the MME using an integrity algorithm and a set of input parameters, wherein the set of input parameters includes a Non Access Stratum (NAS) integrity key; and send an RRC Connection Reestablishment message to the UE, the RRC Connection Reestablishment message including the DL authentication token.

24. The target eNB according to claim 23, wherein the set of input parameters further includes a target cell's identity.

25. The target eNB according to claim 23, wherein the RRC Connection Reestablishment message includes Input MAC CIoT DL.

26. The target eNB according to item 23, wherein the received message is a Patch Switch Request Acknowledge message and includes Input-MAC CIoT DL.

27. The target eNB according to item 23, wherein the received message is a Check MAC Acknowledge message and includes Input-MAC CIoT DL.

28. A Mobility Management Entity (MME) for re-establishing a Radio Resource Control (RRC) connection between a User Equipment (UE) and a target evolved NodeB (eNB), the MME comprising:

a processor; and a computer program product storing instructions that, when executed by the processor, causes the MME to:

calculate a downlink (DL) authentication token using an integrity algorithm and a set of input parameters, wherein the set of input parameters includes a Non Access Stratum (NAS) integrity key as input; and send a message including the generated calculated DL authentication token to the target eNB.

29. The MME according to claim 28, wherein the message is a Path Switch Request Acknowledge message, the message including an Input-MAC CIoT DL.

30. The MME according to claim 28, wherein the message is a Check MAC Acknowledge message, the message including an Input-MAC CIoT DL.

* * * * *

UNITED STATES PATENT AND TRADEMARK OFFICE
CERTIFICATE OF CORRECTION

PATENT NO. : 11,146,951 B2
APPLICATION NO. : 16/084165
DATED : October 12, 2021
INVENTOR(S) : Lehtovirta et al.

It is certified that error appears in the above-identified patent and that said Letters Patent is hereby corrected as shown below:

On the Title Page

In Item (57), under "ABSTRACT", in Column 2, Line 9, delete "Non Access Stratum" and insert -- Non-Access Stratum --, therefor at each occurrence throughout the Patent.

In Item (57), under "ABSTRACT", in Column 2, Line 11, delete "Discloses" and insert -- Disclosed --, therefor.

On Page 2, in Item (56), under "OTHER PUBLICATIONS", in Column 2, Lines 19-20, delete "Non-Access-Stratum" and insert -- Non-Access Stratum --, therefor.

In the Drawings

In Fig. 3b, Sheet 4 of 11, delete "26A.3." and insert -- 26A.4. --, therefor.

In Fig. 5, Sheet 7 of 11, delete "as in FIG. 3" and insert -- as in FIG. 3a --, therefor.

In Fig. 6, Sheet 8 of 11, delete "as in FIG. 3" and insert -- as in FIG. 3a --, therefor.

In the Specification

In Column 2, Lines 28-29, delete "Mobility Management to Entity" and insert -- Mobility Management Entity --, therefor.

In Column 3, Line 34, delete "UE in Context" and insert -- UE Context --, therefor.

In Column 8, Line 29, delete "constant" and insert -- Constant --, therefor.

In Column 8, Line 32, delete "a possibly" and insert -- A possible --, therefor.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,146,951 B2

In Column 8, Line 35, delete "a freshness" and insert -- A freshness --, therefor.

In Column 10, Line 19, delete "an St message" and insert -- an S1 message --, therefor.

In Column 10, Line 21, delete "an St message" and insert -- an S1 message --, therefor.

In Column 11, Line 3, delete "describe above" and insert -- described above --, therefor.

In Column 12, Line 45, delete "information Such" and insert -- information. Such --, therefor.

In Column 13, Line 2, delete "an St message" and insert -- an S1 message --, therefor.

In Column 15, Line 17, delete "computer program produce" and insert -- computer program product --, therefor.

In Column 15, Line 49, delete "processor to may" and insert -- processor 10 may --, therefor.

In Column 15, Line 56, delete "processor to may" and insert -- processor 10 may --, therefor.

In Column 16, Lines 8-9, delete "input/output (I/O) interface ii" and insert -- input/output (I/O) interface 11 --, therefor.

In Column 16, Line 33, delete "manger" and insert -- manager --, therefor.

In Column 16, Line 39, delete "manger" and insert -- manager --, therefor.

In Column 16, Line 43, delete "of FIG. 12," and insert -- of FIG. 8, --, therefor.

In Column 17, Line 29, delete "manger" and insert -- manager --, therefor.

In Column 17, Line 34, delete "manger" and insert -- manager --, therefor.

In Column 17, Line 38, delete "FIG. 13," and insert -- FIG. 9, --, therefor.

In Column 18, Line 24, delete "manger" and insert -- manager --, therefor.

In Column 18, Line 27, delete "step 310" and insert -- step S310 --, therefor.

In Column 19, Line 15, delete "manger" and insert -- manager --, therefor.

In Column 19, Line 17, delete "step 400" and insert -- step S400 --, therefor.

In Column 19, Line 20, delete "manger" and insert -- manager --, therefor.

CERTIFICATE OF CORRECTION (continued)
U.S. Pat. No. 11,146,951 B2

In the Claims

In Column 22, Line 9, in Claim 26, delete "The target eNB according to item" and insert -- The target eNB according to claim --, therefor.

In Column 22, Line 12, in Claim 27, delete "The target eNB according to item" and insert -- The target eNB according to claim --, therefor.

In Column 22, Line 26, in Claim 28, delete "including the generated calculated" and insert -- including the calculated --, therefor.